United States Patent
Lieberwirth et al.

(10) Patent No.: US 11,541,593 B2
(45) Date of Patent: Jan. 3, 2023

(54) EXTRUDER FOR A SYSTEM FOR THE ADDITIVE MANUFACTURE OF METAL PARTS USING THE COMPOSITE EXTRUSION MODELING (CEM) METHOD

(71) Applicant: AIM3D GMBH, Rostock (DE)

(72) Inventors: Clemens Lieberwirth, Rostock (DE); Hermann Seitz, Rostock (DE)

(73) Assignee: AIM3D GMBH, Rostock (DE)

( * ) Notice: Subject to any disclaimer, the term of this patent is extended or adjusted under 35 U.S.C. 154(b) by 608 days.

(21) Appl. No.: 16/304,887

(22) PCT Filed: May 27, 2016

(86) PCT No.: PCT/DE2016/000228
§ 371 (c)(1),
(2) Date: Nov. 27, 2018

(87) PCT Pub. No.: WO2017/202398
PCT Pub. Date: Nov. 30, 2017

(65) Prior Publication Data
US 2020/0324337 A1   Oct. 15, 2020

(51) Int. Cl.
*B29C 64/106*   (2017.01)
*B29C 48/505*   (2019.01)
(Continued)

(52) U.S. Cl.
CPC .......... *B29C 64/106* (2017.08); *B22F 3/1021* (2013.01); *B22F 3/20* (2013.01);
(Continued)

(58) Field of Classification Search
CPC ....... B29C 48/797; B29C 48/89; B29C 48/88; B29C 48/3003; B29C 48/6803;
(Continued)

(56) References Cited

U.S. PATENT DOCUMENTS 3,799,510 A * 3/1974 Schott, Jr. ............. B29C 48/515
                                                        366/147
4,575,330 A   3/1986 Hull
(Continued)

FOREIGN PATENT DOCUMENTS

DE        104254 A1    3/1974
DE       2754877 B1    2/1979
(Continued)

OTHER PUBLICATIONS

Engineering Tool Box, Thermal Conductivity of some selected Materials and Gases, [online] Available at: https://www.engineeringtoolbox.com/thermal-conductivity-d_429.html, Published 2003 (Year: 2003) (Year: 2003).*

(Continued)

*Primary Examiner* — Joseph S Del Sole
*Assistant Examiner* — Ariella Machness
(74) *Attorney, Agent, or Firm* — Brooks Kushman P.C.

(57) ABSTRACT

It is provided an extruder for a system for the additive manufacture of freely formable metal parts with or without a supporting structure by means of an extrusion method from a composite material, which is arranged on a three-dimensionally movable kinematic mechanism, with a building platform. The extruder consists of a housing and a screw arranged in the housing. The extruder is provided with a mechanical drive for the composite material to be extruded, with an exchangeable nozzle, arranged on the housing, and the housing is connected to the mechanical drive by way of suitable means for transporting the composite material.

11 Claims, 4 Drawing Sheets

(51) Int. Cl.
*B29C 48/68* (2019.01)
*B29C 48/30* (2019.01)
*B29C 48/53* (2019.01)
*B29C 48/797* (2019.01)
*B29C 48/80* (2019.01)
*B29C 48/875* (2019.01)
*B29C 64/321* (2017.01)
*B22F 3/20* (2006.01)
*B29C 48/00* (2019.01)
*B33Y 30/00* (2015.01)
*B29C 48/02* (2019.01)
*B29C 48/465* (2019.01)
*B29C 64/165* (2017.01)
*B22F 3/10* (2006.01)
*B29C 48/05* (2019.01)
*B33Y 10/00* (2015.01)

(52) U.S. Cl.
CPC .......... *B29C 48/02* (2019.02); *B29C 48/3003* (2019.02); *B29C 48/467* (2019.02); *B29C 48/509* (2019.02); *B29C 48/53* (2019.02); *B29C 48/6803* (2019.02); *B29C 48/797* (2019.02); *B29C 48/802* (2019.02); *B29C 48/875* (2019.02); *B29C 64/165* (2017.08); *B29C 64/321* (2017.08); *B22F 2003/208* (2013.01); *B29C 48/022* (2019.02); *B29C 48/05* (2019.02); *B29C 48/681* (2019.02); *B33Y 10/00* (2014.12); *B33Y 30/00* (2014.12)

(58) Field of Classification Search
CPC ..... B29C 48/875; B29C 48/80; B29C 48/802; B29C 48/53; B29C 48/525; B29C 48/509; B22F 3/20; B22F 3/227; B22F 2003/208
See application file for complete search history.

(56) References Cited

U.S. PATENT DOCUMENTS

| | | | |
|---|---|---|---|
| 5,121,329 A | * | 6/1992 | Crump .................. B29C 64/40 228/180.5 |
| 5,273,356 A | | 12/1993 | Piccolo, Sr. et al. |
| 5,764,521 A | * | 6/1998 | Batchelder ............. B29C 48/92 425/149 |
| 2009/0263582 A1 | | 10/2009 | Batchelder |
| 2015/0321419 A1 | | 11/2015 | Linthicum et al. |
| 2016/0200024 A1 | * | 7/2016 | Kim ...................... B29C 48/832 425/375 |
| 2016/0263830 A1 | * | 9/2016 | Batchelder ............ B29C 64/118 |

FOREIGN PATENT DOCUMENTS

| | | | | |
|---|---|---|---|---|
| DE | 19943738 C1 | | 3/2001 | |
| DE | 19929824 C2 | | 1/2002 | |
| DE | 10058143 A1 | | 5/2002 | |
| DE | 202005018685 U1 | | 1/2006 | |
| DE | 102007019100 A1 | | 11/2008 | |
| DE | 102005056260 B4 | | 12/2008 | |
| DE | 102011005929 A1 | | 9/2012 | |
| DE | 102012217182 A1 | | 3/2014 | |
| DE | 102014018081 A1 | | 6/2016 | |
| EP | 2957420 A1 | | 12/2015 | |
| JP | 2000144205 A | * | 5/2000 | |
| JP | 2000144205 A | | 5/2000 | |
| WO | 0051809 A1 | | 9/2000 | |
| WO | WO-2007116904 A1 | * | 10/2007 | ............ G02B 1/04 |
| WO | 2013030226 A2 | | 3/2013 | |

OTHER PUBLICATIONS

Kollenberg, W., "Keramik und Multi-Material 3D-Druck," Keramische Zeitschrift 04 (2014) p. 233-236; English Abstract.

* cited by examiner

EXTRUDER FOR A SYSTEM FOR THE ADDITIVE MANUFACTURE OF METAL PARTS USING THE COMPOSITE EXTRUSION MODELING (CEM) METHOD

CROSS-REFERENCE TO RELATED APPLICATIONS

This application is a U.S. National Phase application of International Patent Application Number PCT/DE2016/000228, filed on May 27, 2016, the entirety of which is incorporated by reference herein.

TECHNICAL FIELD

This disclosure relates to an extruder for a system for the additive manufacture of metal components, known as composite extrusion modeling. The extruder may however also be used generally for processing plastics.

The additive manufacture of metal parts is still a costly and complex alternative to conventional production (molding, machining, etc.).

Nevertheless, it is used in relatively large scale facilities of the aeronautical and aerospace, automotive and medical engineering sectors. This is especially because additive manufacture provides unprecedented freedom of design: complex shapes with undercuts; biological structures up to and including one-to-one copies of human bone structures; and lightweight components with lattice or honeycomb structures, thermally stressed, flow-conducting parts (for example rocket engine parts).

BACKGROUND

In the area of additive manufacturing methods, various methods have become established in the past 30 years, distinguishable especially by the manner in which the layers are generated in conjunction with the starting material: the curing of a UV-sensitive resin; the fusing together of a powder bed by binders; the melting and solidifying of a powder bed by laser or electron beams the melting and solidifying of a plastic wire by a heated nozzle.

The most important additive manufacturing methods are stereolithography (STL), 3D printing (3DP), selective laser sintering (SLS), electron beam melting (EBM) and fused deposition modeling (FDM).

Stereolithography was disclosed for the first time in U.S. Pat. No. 4,575,330 A. In the case of this method, a building platform is immersed by a certain layer thickness into a bath of liquid UV-curable resin. By means of a UV laser, the first layer of the component is fused together on the building platform. The steps of lowering and fusing together the component are subsequently repeated and thus the component "grows" from the bottom up on the building platform. The method has very good detailing and surface qualities but, because of the resins used, is mainly suitable for display models and specimens.

The actual 3D printing describes a method in which a layer of a starting material in powder form (polymers, ceramic, metal, sand) is applied to a building platform by a doctor blade. Subsequently, a printhead, similar to that of an inkjet printer, travels over the powder and selectively sprays a binder into the powder in order to fuse together the contour and filling of the component. These two processes are repeated until the component is completed.

Further powder-processing methods are the sintering and melting methods, which fuse together the contours of the components in the powder bed either with a laser (SLS, SLM) or else with an electron beam (EBM). The layered application of the metallic powder in this case takes place in a way similar to 3D printing in an enclosed building space, which is under a vacuum and contains a shielding gas. The high-energy beams are moved along on the powder bed either by means of mirror mechanisms or by means of electromagnets. In this case, the powder bed is locally melted and subsequently solidifies again. In the case of the SLM and EBM methods, the energy input is in this case so great that very dense components, with up to 99% of the density of the solid material, are produced. In the case of the SLS method, the individual powder particles are only sintered, which leads to a more porous component.

The components of the melting methods have very good mechanical properties but, owing to the high procurement costs (lasers and mirror mechanisms) and material prices and the high-maintenance technology, the methods are among the most expensive methods. Moreover, the systems are often up to 200 times larger than the actual building space and, in the case of work with metal powders, there is in principle the risk of dust explosions and metal fires.

A further thermal method is the fused deposition modeling method. It is described in U.S. Pat. No. 5,121,329 A. In the case of this method, a thermoplastic wire is forced through a heated nozzle and, by moving the building platform and/or the extruder, replicates the individual layers of the component on the building platform. The second and all further layers are in this case respectively printed onto the structure lying thereunder. By contrast with the other methods, components are produced here in a freely formed state and are not surrounded by material that is not fused together.

The methods that are suitable for the manufacture of metal and ceramic parts work with metal powders, are expensive and require special protective measures. It must be ensured that at no time is the powder blown, and can thereby cause a dust explosion and a metal fire. The building space must be freed of loose powder after a printing process, and even the component itself is encrusted with powder that has to be removed by additional equipment. Owing to the buildup of layers, the entire building space around the actual component and also hollow structures in the component are filled with loose powder.

There are already proposals for establishing new additive manufacturing methods for the processing of metallic or ceramic components. WO 2000 051 809 A1 discloses the so-called paste polarization method. This is similar in the way in which it operates to stereolithography, with the difference that paste is used instead of a liquid UV-sensitive resin as the starting material. The paste consists of 35-60% metal or ceramic particles and a UV-sensitive resin. The resin serves as a binder and provides the strength of the component after the printing process. However, the method has not been commercialized.

A further hybrid method, which allows the generation of metal parts by means of known additive manufacturing methods, is described in DE 10 2005 056 260 B4. In this case, the 3D printing method is used to inject binder into metallic or ceramic powder. The buildup of layers takes place in the same way as in 3D printing. After the printing process, the cured binder provides the strength in the so-called green blank, while a solid metal part, which however has a low density because of the high binder content, is produced by subsequent burning out of the binder in an oven and sintering of the metal or ceramic particles. The method can likewise be used for generating sand molds and casting cores. The method still has the disadvantage of high procurement costs, which inhibit wider use.

The methods mentioned also have the disadvantage that closed hollow structures cannot be generated, and material that is not fused together has to be removed manually from the interior of the component and the area surrounding the component. Furthermore, in the manufacture of metal and ceramic parts by means of 3DP, it must still be remembered that the starting material in powder form is difficult to handle.

A further method for producing shaped parts from metal and/or ceramic particles bound in a binder is powder injection molding. In this case, shaped parts are produced from powder-containing material by means of injection molding. A so-called feedstock is melted in a plasticizing unit with a screw by thermal conduction from outside by means of heater bands attached to the plasticizing cylinder and as a result of dissipation in the melt during the mixing in the screw barrel. The feedstock consists of a defined proportion by volume of powder and a proportion by volume of the binder component. The ratio of the powder component to the binder component influences the flow properties and determines the shrinkage of the component during sintering.

DE 10 2007 019 100 A1 relates to a method for injection molding an injection-moldable compound in an injection molding machine, which has a plasticizing unit provided with a screw, an injection unit, a machine control and a mold with a cavity, wherein injection-moldable compound can be injected into the cavity and wherein the injection-moldable compound consists of at least one powder component and at least one binder component. This document also relates to an injection molding machine. The binder component becomes molten in the plasticizing cylinder, while the powder component remains in the solid state of aggregation. After the injection-molding process, the molded parts are sintered. The feedstock is homogenized in compounding devices before the processing in the injection molding machine.

The disadvantage in the case of this method is the use of molds into which feedstock material is injected and in which it also cures. It is not possible with this method to produce freely formable components, since it is not an additive manufacturing method.

Furthermore, an FDM method for producing green blanks from ceramic materials is described in the Keramische Zeitschrift [ceramic journal] April 2014, page 235, wherein a ceramic compound is filled into an injector and the injector is moved over x, y and z axes while the plunger of the injector discharges the compound out of the nozzle of the injector. In this case, it is not a molten filament but a cold plastic compound that is extruded by means of a nozzle and deposited.

This method is used for producing green blanks from ceramic compounds, but not for producing components. The surfaces are too uneven for this. With the method, only near-net-shape semifinished products can be produced for subsequent green or biscuit machining.

JP 2000 144 205 A describes a method for producing three-dimensional structures from metal or ceramic powder, wherein the powder bound in a thermoplastic resin is applied three-dimensionally to a building platform by means of an extruder and, after completion of the structure, the binder is removed. It is not planned for this to be used on an industrial scale, since the processing of standard MIM materials in an additive process involves technical difficulties. Here, a classic MIM extruder is used and the movable bed makes the process unsuitable for relatively large parts, because the component becomes increasingly heavy. The use of granules is intended for much larger systems, the classic three-zone extruder operates horizontally and is of a much larger design.

DE 10 2012 217 182 A1 describes a method for producing a refractory metal component, wherein the method comprises the following steps
providing a starting material, which comprises a refractory metal powder of at least one refractory metal and/or a compound thereof and also at least one binder; and
molding the starting material into at least one green body, wherein the starting material comprises a ceramic powder.

The refractory metal component is produced by means of extruding, wherein the starting material represents an extrusion compound.

DE 10 2011 005 929 A1 discloses a carrier structure, in particular for a device for producing a component by a layer building method, with a surface, wherein the carrier structure is mounted displaceably in a vertical direction, which is aligned substantially perpendicular to the surface. In this case, the carrier structure comprises a plurality of individual stampers, which can in each case be moved in the vertical direction. This document also relates to a device with such a carrier structure and also to a method for producing components. The device for producing a component, in particular by a layer building method, consists of a container, which comprises a building space for receiving a starting material in powder form, a beam generating device for generating an energy beam with which the starting material in powder form can be fused together to form at least a portion of a supporting structure, wherein the bottom of the building space is formed by a carrier structure.

DE 10 2007 019 100 A1 presents a method for injection molding an injection-moldable compound in an injection-molding plasticizing unit, which comprises an injection unit, a machine control and a mold with a cavity, wherein injection-moldable compound can be injected into the cavity and wherein the injection-moldable compound consists of at least one powder component and at least one binder component. In order to improve the processing of the powder-containing injection-molding compound, the method provides the steps of: a) ascertaining the injection work (WE); b) ascertaining the metering work (WD); c) if there is a rise or fall in the injection work (WE) ascertained according to step a) out of a tolerance range and the metering work (WD) ascertained according to step b) remains within a tolerance range: not initiating a measure for influencing the homogeneity of the mixture of the injection-moldable compound; d) if there is a rise or fall in the injection work (WE) ascertained according to step a) out of a tolerance range and a rise or fall of the metering work (WD) ascertained according to step b) out of a tolerance range: initiating a measure for influencing the homogeneity of the mixture of the injection-moldable compound.

In the patent application of the applicant with the file application number DE 10 2014 018 081, a system for the additive manufacture of metal parts using the composite extrusion modeling (CEM) method is described, consisting of one or more extruders, which are rigidly mounted freely selectably on a kinematic mechanism of the system for generating the three-dimensional component structure that is movable in the x, y or z axis and is connected to the control of a 3D printer. The movements of the extruder are performed over the x, y and z axes of the kinematic mechanism, wherein the building platform is designed as immovable, or by a combination of the movement of the extruder with the movement of the building platform in the corresponding axes. The extruder consists of a mechanical drive, a heated housing and an exchangeable nozzle fastened to the heated housing, wherein the heated housing is provided with the mechanical drive by way of suitable means for transporting the composite material from the mechanical drive to the heated housing. The mechanical drive is formed as a stuffing screw or as a star wheel or as drive wheels.

The composite material in the form of granules, coarse-grained powder or sticks is transported by means of the mechanical drive into the heated housing, compressed and plasticated and extruded through an exchangeable nozzle. The charging of the mechanical drive may in this case be performed by way of a loose fill, through a positive-pressure line or a corresponding metering device. However, the design of the extruder with a completely heated housing presents difficulties in the additive manufacture of metallic components by so-called composite extrusion modeling, and the method with the extruder that is used in this system described keeps having system failures when producing the metallic components.

DE 199 43 738 C1 relates to an extruder system for processing rubber compounds or thermoplastics which comprises a feed zone, a plasticating zone and a pressure buildup zone, with a screw extruder and a gearwheel extruder, which is connected thereto downstream in the direction of extrusion and to which an extruding nozzle can be connected. In this case, the screw extruder is an extruder of a shortened overall length (short extruder), which just comprises a feed zone, and that the gearwheel extruder forms the plasticating and pressure buildup zone. The metering device may also be formed as a star wheel feeder.

DE 199 29 824 C2 describes an extruder for plasticating thermoplastic media which is provided in an inlet region with a granules inlet (E) and at the opposite end with an outlet bore (A), with a motor-driven threaded spindle (S) which is arranged in a jacket (M) with an opposite jacket thread (MG), wherein, over a melting region of the spindle length, the length-specific free total cross section (GS+QM) of the spindle thread (SG) and the jacket thread (MG) is approximately constant and the free spindle thread cross section (QS) and the free jacket thread cross section (QM) change linearly there in a complementary manner.

With the solutions known from the prior art, it has not been possible so far to manufacture metallic, freely formable components with a high density or closed hollow structures of metal, low shrinkage and consequently with great strength by means of additive thermoplastic methods, such as the FDM method. High procurement and material costs, maintenance costs, the size of the systems and the complexity of the methods represents a further disadvantage of the technical solutions of additive manufacture disclosed so far. Furthermore, it has not been possible with the known technical solutions to produce freely formable components by FDM methods, the starting material of which is a composite material comprising a thermoplastic binder and a high proportion of metal particles, for example commercially available feedstock materials. Furthermore, the systems known from the prior art keep failing when producing metallic components by means of composite extrusion modeling methods.

SUMMARY

In one or more embodiments, an extruder for a system for generating metal parts from composite material comprising a thermoplastic binder and metal particles in the form of granules, coarse-grained powder or sticks, is provided. As a result of much lower costs and a better ratio of the installation space required to the size of the system, this novel extruder in combination with the system according to DE 10 2014 018 081.6 is intended to also be attractive to small and medium-sized companies. As a result, the manner of product development and promotion of innovations as a whole can be improved. Components are intended to be freely generated on the building platform, whereby no manual removal of unbonded material or cleaning of the building space will be required. Furthermore, the system is only intended to process materials in bonded form, in order to prevent the risk of a dust explosion and avoid the necessity for a vacuum and shielding gas during the printing process.

In one or more embodiments, the extruder for a system for the additive manufacture of metal parts by means of an extrusion method of composite extrusion modeling (CEM) may include one or more extruders, which are rigidly mounted freely selectably on a kinematic mechanism of the system for generating the three-dimensional component structure that is movable in the x, y or z axis and is connected to the control of a 3D printer. The movements of the extruder are performed over the x, y and z axes of the kinematic mechanism, wherein the building platform is designed as immovable, or by a combination of the movement of the extruder with the movement of the building platform in the corresponding axes.

The extruder may include a housing and a screw arranged in the housing, wherein the housing is divided into a
- feed zone with active cooling, in which the housing is designed as a funnel and the material consists of a material with good thermal conductivity; the screw has a small shaft diameter for good material take-up,
- separating zone, in which the housing consists of material with poor thermal conductivity and separates the cooled feed zone thermally from the heated plasticating zone,
- plasticating and homogenizing zone, in which the housing of material with good thermal conductivity is connected to active heating and the screw has a greater shaft diameter than in the upper zones, whereby the plastication is promoted and a compression is achieved,
- discharge zone consists of an exchangeable nozzle of an abrasion-resistant material (hardened high-grade steel).

The shaft diameter of the screw is in this case formed conically and increases uniformly from zone to the end of zone.

The extruders are connected to a mechanical drive for the composite material to be extruded, and the housing is connected to the mechanical drive by way of suitable means for transporting the composite material.

In one embodiment, the diameter of the shaft of the screw in the plasticating and homogenizing zone is formed as greater than the diameter of the feed zone and separating zone and consists in the separating zone of a material with a poor thermal conductivity.

In another embodiment, the material of the separating zone of the housing consists of a plastic or ceramic, for example of a polyetherether ketone or of polysulfone, and the material of the feed zone and the plasticating and homogenizing zone consists of aluminum.

In a further embodiment, the mechanical drive is formed as a stuffing screw or as a star wheel or as drive wheels and a positive-pressure line or metering line for charging with composite material in solid form in the form of a thermoplastic binder and metal particles are arranged on the mechanical drive for the composite material to be extruded.

In a further embodiment, a suitable means for transporting the composite material from the mechanical drive to the housing may be formed as a flexible tube.

The extruder is set in the feed zone with the cooling for the composite material, in the plasticating and homogenizing zone by means of the heating to a temperature for plasticating the composite material and in the discharge zone to the melting temperature of the composite material.

On the kinematic mechanism, one or more or multiple extruders may be arranged.

DETAILED DESCRIPTION

Figure 2:
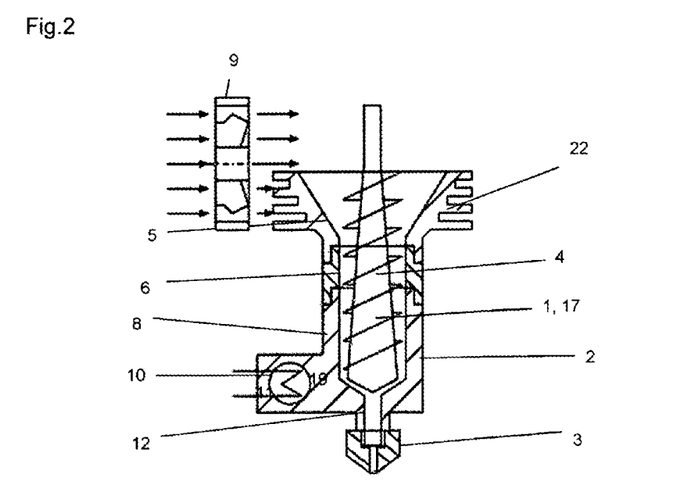
FIG. 2 shows a diagram of the structure of the extruder.

The extruder (7) especially designed for this purpose, consisting of a housing (2) and a screw (4) arranged in the housing (2), was produced for this, wherein the housing (2) of the extruder (7) is divided into a feed zone (5) with active cooling (9), in which the housing (2) is designed as a funnel (22) and the material consists of a material with good thermal conductivity; the screw (4) has a small shaft diameter for good material take-up, separating zone (6), in which the housing (2) consists of material with poor thermal conductivity and separates the cooled feed zone (5) thermally from the heated plasticating and homogenizing zone (8), plasticating and homogenizing zone (8), in which the housing (2) consists of a material with good thermal conductivity and is provided with active heating and the screw (4) has a greater shaft diameter than in the upper zones (5, 6), whereby the plastication is promoted and a compression is achieved, discharge zone (12) consists of an exchangeable nozzle (3) of an abrasion-resistant material (hardened high-grade steel).

The shaft diameter of the screw (4) is formed conically and increases uniformly from the feed zone (5) to the end of the plasticating and homogenizing zone (8).

Figure 3:
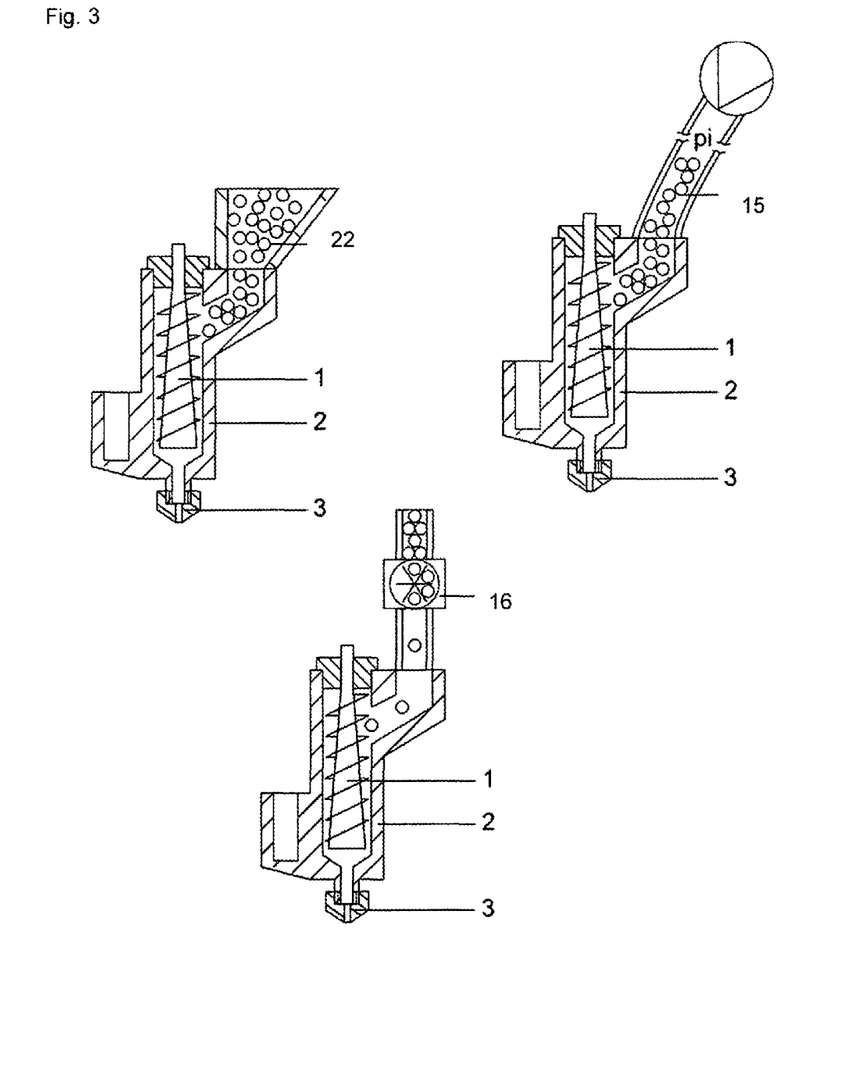
FIG. 3 shows the possibilities for filling the extruder.
Figure 4:
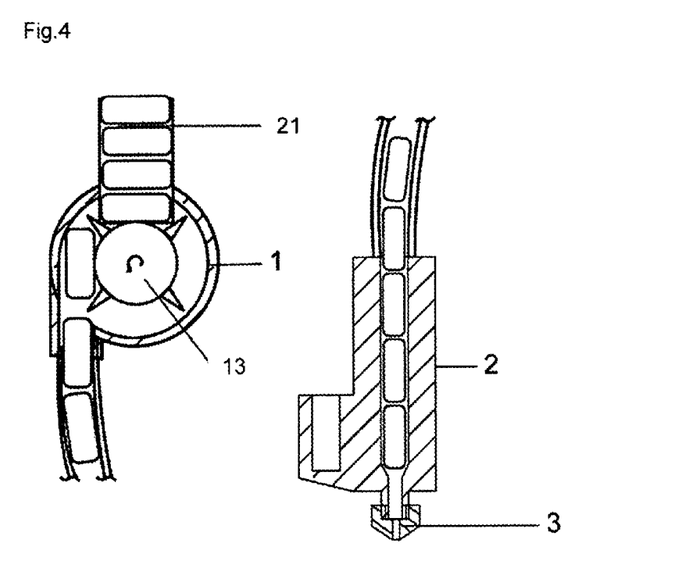
FIG. 4 shows the mechanical drive formed as a star wheel.

The extruders (7) are connected to a mechanical drive (1) for the composite material to be extruded, and the housing (2) is connected to the mechanical drive (1) by way of suitable means for transporting the composite material, wherein the mechanical drive (1) is formed by a stuffing screw (17). The stuffing screw (17) is connected as a mechanical drive (1) to the housing (2) by way of a metering unit (16) and is charged with a commercial metal-plastic composite material, consisting of POM as a thermoplastic binder and high-grade steel particles in a proportion of 93% of the composite material. The material takes the form for example of granules, which are usually used in powder injection molding as the so-called feedstock.

Figure 5:
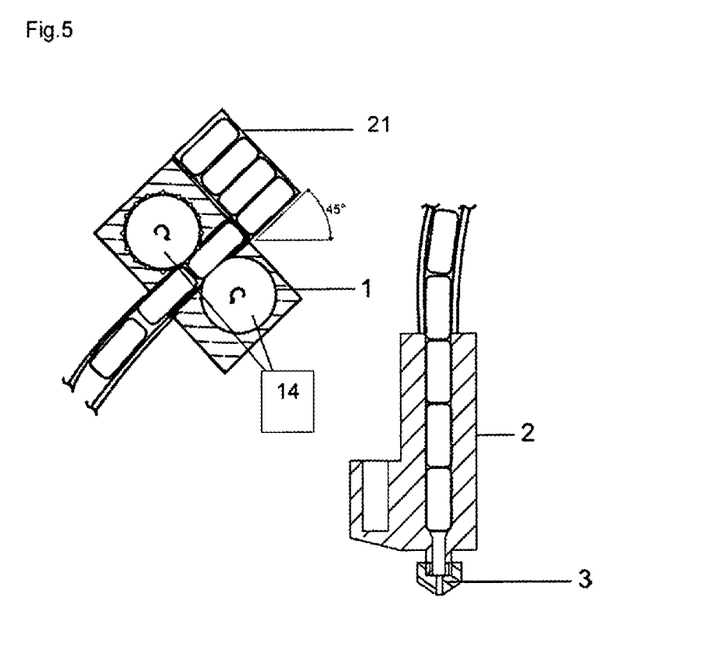
FIG. 5 shows the mechanical drive formed as drive wheels.
Figure 6:
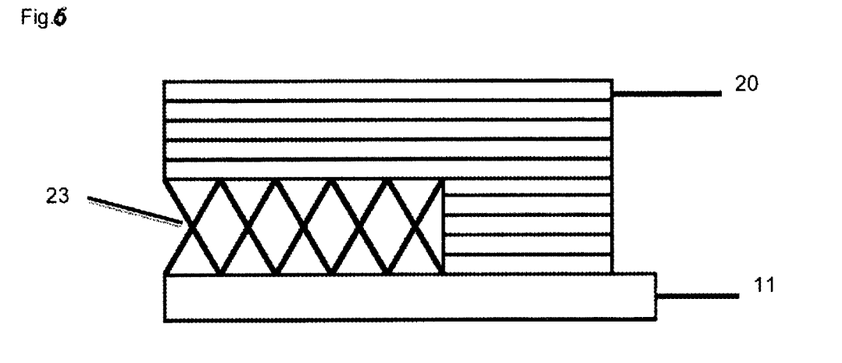
FIG. 6 shows a diagram of a component with a supporting structure.

However, as shown in FIGS. 5 and 6, the drive unit (1) may also be formed as a star wheel (13) or as drive wheels (14), wherein the star wheel (13) or the drive wheels (14) are connected to the housing (2).

In the actively cooled feed zone (5), the granules and the housing, which consists of a material with good thermal conductivity, for example of aluminum, are cooled, in order in this way to be able to feed a greater amount of material to the process. As a result of the separating zone (6) being made of a material with poor thermal conductivity, for example ceramic or plastic, after this cooling of the granules a thermal separation from the plasticating and homogenizing zone (8) takes place. The molding compound is compressed and the air enclosed in the composite material is forced out. Within the molding compound there then occurs a frictional heat, which, assisted by the heated housing part of the plasticating and homogenizing zone (8), for example of aluminum, makes the molding compound go over into the plastic state in the plasticating and homogenizing zone (8). From the discharge zone (12), the molten molding compound is applied in the form of a filament to the building platform (11) by way of the nozzle (3), controlled by the kinematic mechanism (18).

Figure 1:
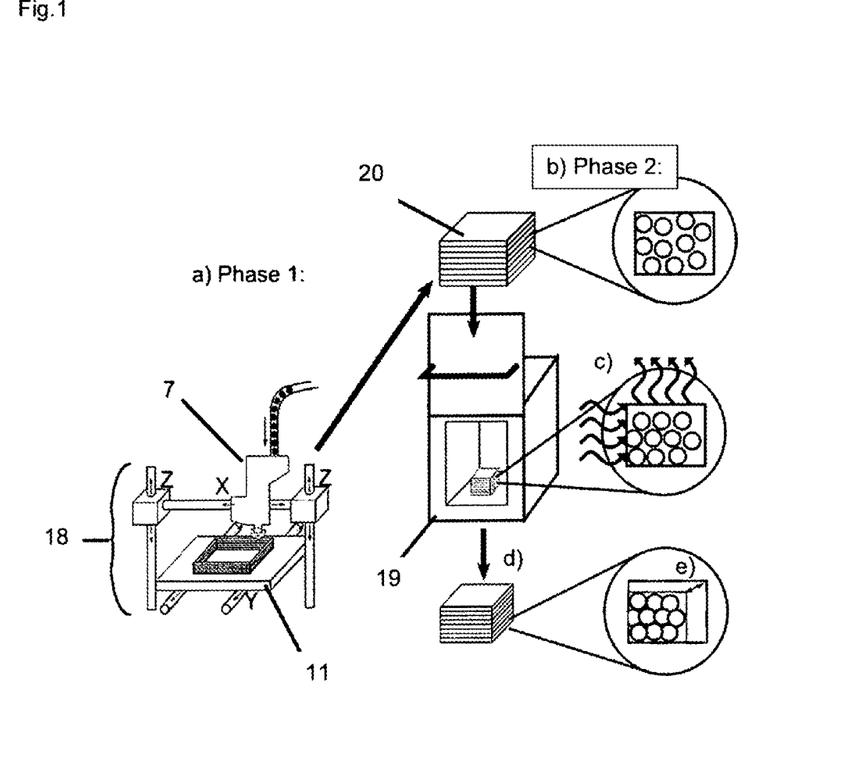
FIG. 1 shows a schematic representation of the system.

An optimum temperature for example, 200° C. is set in the homogenizing and discharge zone (8) and an extrusion rate, after conversion, of 15 mm/s is set. The extruder (7) is installed perpendicularly on an XYZ gantry kinematic mechanism and connected to the control of a 3D printer. By way of the control, a two-dimensional structure of the material in the form of a filament was then applied to the building platform (11) and cured. After that, the extruder (7) was moved upward in the z axis, by the amount of the layer thickness (dz), and the material structure in the form of a filament was once again applied to the existing structure on the building platform (11) by way of the nozzle (3) of the extruder (7) and cured. This is repeated until the component is obtained as a green part (20), with or without a supporting structure (23). After the completion of the green part (20), it is removed from the building platform (11) and the binder is removed in a sintering oven (19) and, by further heating, the metal particles form so-called sintering necks at their contact points. That is to say that the grains fuse together and enter into a solid bond. After the completed sintering process, the finished component can be removed from the oven; because of the dissolved binder, there may be a defined loss of volume of the component.

The strength of the green part corresponds in this case to that of the thermoplastic binder, and it is consequently sufficient to remove the component from the building platform undamaged. Since the material is for example standard granules for powder injection molding, the feasibility of the postprocessing of the green part by means of a sintering oven is ensured. From this point on, the method does not in fact differ from the sintering process in powder injection molding.

It possible to generate complex components from high-strength ceramic or metallic materials, for example high-grade steel, that correspond to a density of 98% of the solid material. At the same time, the method is made much more affordable than comparable additive manufacturing methods, and has a much better ratio of the installation space required to the size of the system. The possibility of generating internal hollow structures allows completely new design elements to be developed in the area of lightweight construction. For example, parts with closed surfaces and internal honeycomb and lattice structures. The low costs of the method to make these lightweight components more affordable, and consequently accessible to a wider group of users. Because of the fact that, during the printing process (phase 1), only the thermoplastic component of the composite material is plasticated, the metal or ceramic powder is not at any time in an unbonded form, whereby the risk of a dust explosion is eliminated. For this reason, the printing process can take place in ambient atmosphere and does not require any protective equipment. The systems for generating the components in phase 1 are relatively small and have robust mechanics, as a result of which the method is likewise suitable for mobile use. The layer buildup of thermoplastic material is likewise suitable for weightlessness.

This system can be used not only for processing composite materials into metal parts, but also for methods of processing plastics, such as extrusion, injection molding and the like, for the production of freely formable parts.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 mechanical drive
2 housing of the extruder (7)
3 nozzle
4 screw
5 feed zone
6 separating zone
7 extruder
8 a plasticating and homogenizing zone
9 cooling
10 heating
11 building platform
12 discharge zone
13 star wheel
14 drive wheels
15 positive-pressure line
16 metering device
17 stuffing screw
18 kinematic mechanism
19 sintering oven
20 green part
21 sticks
22 funnel
23 supporting structure

The invention claimed is:

1. An extruder for a system for the additive manufacture of freely formable metal parts from a composite material, the extruder comprising:
    a housing;
    a mechanical drive for the composite material to be extruded, the mechanical drive being connected to the housing for transporting the composite material; and
    an exchangeable nozzle arranged on the housing and made of an abrasion-resistant material,
    wherein the housing is divided into,
        a feed zone in which the housing is designed as a funnel and the material of the housing consists of a material with good thermal conductivity, wherein the funnel of the feed zone is provided with active cooling;
        a separating zone, in which the housing consists of a material with poor thermal conductivity;
        a plasticating and homogenizing zone, in which the housing consists of material with good thermal conductivity and is provided with active heating, wherein the separating zone separates the cooled feed zone thermally from the heated plasticating and homogenizing zone; and
        a discharge zone, which includes the exchangeable nozzle,
    wherein the mechanical drive includes a screw arranged in the housing and extending through the funnel of the feed zone, the separating zone, and the plasticating and homogenizing zone, wherein a shaft diameter of the screw is greater in the plasticating and homogenizing zone than in the feed zone and than in the separating zone, and wherein the screw is formed conically and increases uniformly from the feed zone to an end of the plasticating and homogenizing zone.

2. The extruder of claim 1, wherein a shaft of the screw in the separating zone includes a material with a poor thermal conductivity.

3. The extruder of claim 1, wherein the material of the housing in the feed zone and in the plasticating and homogenizing zone includes aluminum.

4. The extruder of claim 1, wherein the material of the separating zone of the housing includes a heat-resistant plastic or ceramic.

5. The extruder of claim 3, wherein the material of the separating zone of the housing includes a polyetherether ketone or of polysulfone.

6. The extruder of claim 1, wherein the extruder comprises a flexible tube for transporting the composite material from the mechanical drive to a heated portion of the housing.

7. The extruder of claim 1, wherein the screw extends through at least 50 percent of the funnel.

8. The extruder of claim 7, wherein the screw extends completely through the funnel.

9. An extruder for a system for the additive manufacture of freely formable metal parts from a composite material, the extruder comprising:
    a housing;
    a mechanical drive for the composite material to be extruded, the mechanical drive being connected to the housing for transporting the composite material; and
    an exchangeable nozzle arranged on the housing and made of an abrasion-resistant material,
    wherein the housing is divided into,
    a feed zone in which the housing is designed as a funnel and the material of the housing consists of a material with good thermal conductivity, wherein the funnel of the feed zone is provided with active cooling;
    a separating zone, in which the housing consists of a material with poor thermal conductivity;
    a plasticating and homogenizing zone, in which the housing consists of material with good thermal conductivity and is provided with active heating, wherein the separating zone separates the cooled feed zone thermally from the heated plasticating and homogenizing zone; and
    a discharge zone, which includes the exchangeable nozzle;
    wherein the mechanical drive includes a star wheel or drive wheels, and wherein a positive-pressure line or metering device for charging with the composite material in solid form in the form of a thermoplastic binder and metal particles are arranged on the mechanical drive for the composite material to be extruded.

10. The extruder of claim 9, wherein a positive-pressure line or metering device for charging with the composite material in solid form in the form of a thermoplastic binder and metal particles are arranged on the mechanical drive for the composite material to be extruded.

11. The extruder of claim 10, wherein the metering device is formed as a star wheel feeder.

* * * * *